(12) United States Patent
Yeh

(10) Patent No.: US 7,391,722 B2
(45) Date of Patent: Jun. 24, 2008

(54) METHOD AND SYSTEM FOR DETERMINING LINK CONGESTION

(75) Inventor: Hae Shyong Yeh, Plano, TX (US)

(73) Assignee: Alcatel Lucent, Paris (FR)

(*) Notice: Subject to any disclaimer, the term of this patent is extended or adjusted under 35 U.S.C. 154(b) by 593 days.

(21) Appl. No.: 11/015,621

(22) Filed: Dec. 17, 2004

(65) Prior Publication Data
US 2005/0180320 A1 Aug. 18, 2005

Related U.S. Application Data

(60) Provisional application No. 60/545,233, filed on Feb. 17, 2004.

(51) Int. Cl.
*H04J 1/16* (2006.01)
*H04J 3/14* (2006.01)

(52) U.S. Cl. .................................. 370/229; 370/236

(58) Field of Classification Search ............... 370/229, 370/230, 230.1, 235, 236, 412–418; 709/230, 709/23 E, 235
See application file for complete search history.

(56) References Cited

U.S. PATENT DOCUMENTS

2006/0078008 A1* 4/2006 Bordonaro et al. ........... 370/522
2006/0245550 A1* 11/2006 Ferguson et al. ......... 379/32.01

FOREIGN PATENT DOCUMENTS

| EP | 1128610 A2 | 8/2001 |
|---|---|---|
| WO | 00/60817 A1 | 10/2000 |

* cited by examiner

*Primary Examiner*—Ajit Patel

(57) ABSTRACT

A computerized method for determining a congestion level for a buffer associated with an SS7 link according to a first set of congestion rules includes receiving an abatement level and an onset level for the buffer. The method also includes generating, based on the received abatement level and the received onset level, more than two threshold levels for use by the congestion program. The congestion program is operable to generate a congestion level for the buffer according to a second set of rules different from the first set of rules. The method also includes providing the threshold levels to the congestion program, receiving from the congestion program a congestion level for the buffer based on the threshold values, the usage of the buffer, and the second set of rules, and converting the received congestion level into a converted congestion level.

20 Claims, 2 Drawing Sheets

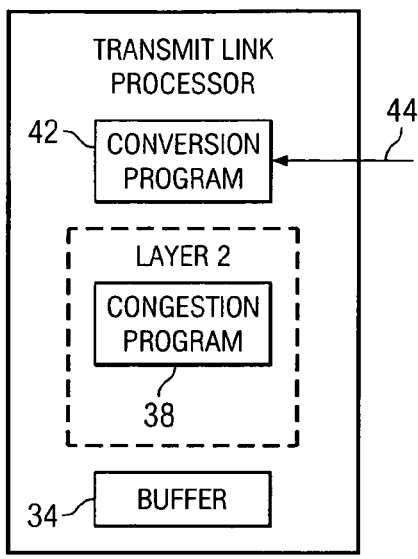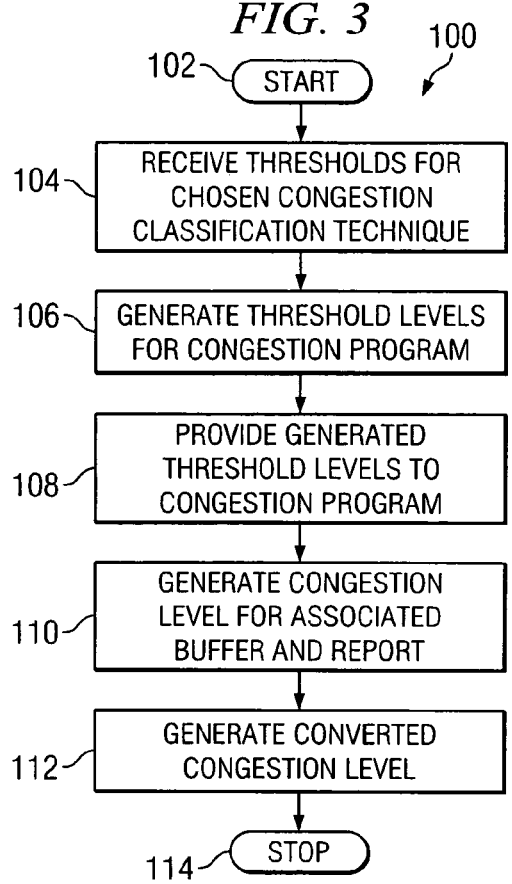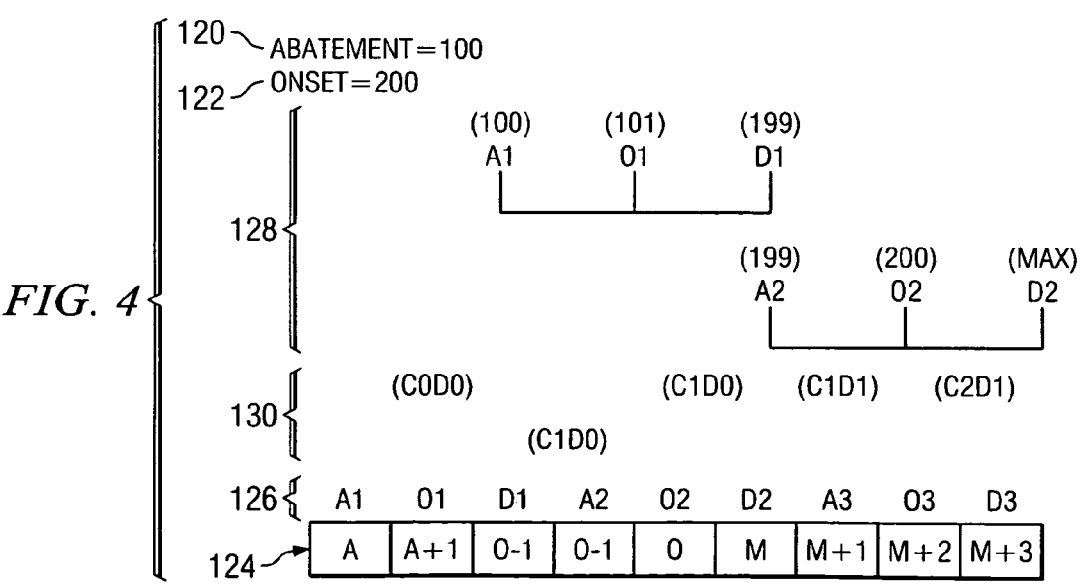

METHOD AND SYSTEM FOR DETERMINING LINK CONGESTION

TECHNICAL FIELD OF THE INVENTION

This application claims the benefit under 35 U.S.C. Section 119(e) of provisional application Ser. No. 60/545,233, filed Feb. 17, 2004, entitled "Use A Common Method To Handle Both Congestion With Priority And Congestion With Level."

TECHNICAL FIELD OF THE INVENTION

This invention relates generally to communications and more particularly to a method and system for determining link congestion.

BACKGROUND OF THE INVENTION

Communications is becoming increasingly important in today's society. One component of some modern telecommunications systems is a link processor that accumulates multiple SS7 links and provides or receives data from a switch. Such accumulated data may be stored in a buffer within the link processor. Often it is important to assess the congestion level of the buffer.

Several conventional techniques exist for categorizing the congestion of the buffer in a link processor. Three of these techniques are referred to as the National Technique with multiple congestion levels and multiple congestion priorities (hereinafter "Technique 1"), the National Technique with multiple congestion levels without congestion priority (hereinafter "Technique 2"), and the International Technique without congestion level (hereinafter "Technique 3"). All three techniques are described in the standard identified as ITU Q.704, which is incorporated herein by reference. According to Technique 1, which is used in national signaling networks, nine different thresholds including three abatement thresholds, three onset level thresholds, and three discard thresholds are utilized to determine the congestion level of the buffer. The congestion level is typically reported as: cXdY, where X is the level of congestion and Y is the discard level. Technique 2, also used in national signaling networks, uses two thresholds, one onset threshold and one abatement threshold, and, in general, provides three different congestion levels. According to Technique 2, the congestion level is incremented or decremented based on the usage of the buffer as compared to a previous usage of the buffer. Technique 3, which is commonly used in international signaling networks, simply classifies the level of congestion of the buffer in the link processor as congested and uncongested. These three congestion categorization techniques involve nine, two, and two thresholds, respectively. These thresholds are often user specified.

Conventionally, functionality for determining the congestion level of the buffer based upon the provided threshold levels and usage of the buffer is programmed at Level 2 of the SS7 protocol stack, which is often done in assembly, or in hardware implementation. Consequently, modifications to any existing congestion program are difficult and have to be applied to different types of implementation.

SUMMARY OF THE INVENTION

A computerized method for determining a congestion level for a buffer associated with an SS7 link according to a first set of congestion rules includes receiving an abatement level and an onset level for the buffer. The method also includes generating, based on the received abatement level and the received onset level, more than two threshold levels for use by the congestion program. The congestion program is operable to generate a congestion level for the buffer according to a second set of rules different from the first set of rules. The method also includes providing the threshold levels to the congestion program, receiving from the congestion program a congestion level for the buffer based on the threshold values, the usage of the buffer, and the second set of rules, and converting the received congestion level into a converted congestion level.

Some embodiments of the invention provide numerous technical advantages. Some, none, or all embodiments of the invention may benefit from the below described advantages. According to one embodiment of the invention, a method and system are provided that allow calculation of a congestion level according to one set of rules by utilizing a program that generates congestion status according to a second set of rules. In some embodiments, this allows the use of existing congestion status programs without rewriting lower level assembly language programs. Further, in some embodiments, a single link processor may accommodate various congestion classification approaches.

Other advantages will be readily apparent to one of skill in the art.

BRIEF DESCRIPTION OF THE DRAWINGS

Reference is now made to the following description taken in conjunction with the accompanying drawings, wherein like reference numbers represent like parts, in which:

FIG. 2 is a block diagram illustrating additional details of one example of a link processor according to the teachings of the invention;

FIG. 3 is a flowchart illustrating example steps associated with a conversion program according to the teachings of the invention;

FIG. 4 is a diagram illustrating correlation between congestion thresholds according to Technique 1 and according to Technique 2; and FIG. 5 is a diagram illustrating correlation between congestion thresholds for Technique 1 and Technique 3.

DETAILED DESCRIPTION OF THE INVENTION

Embodiments of the invention are best understood by referring to FIGS. 1A through 5 of the drawings, like numerals being used for like and corresponding parts of the various drawings.

Figure 1A:
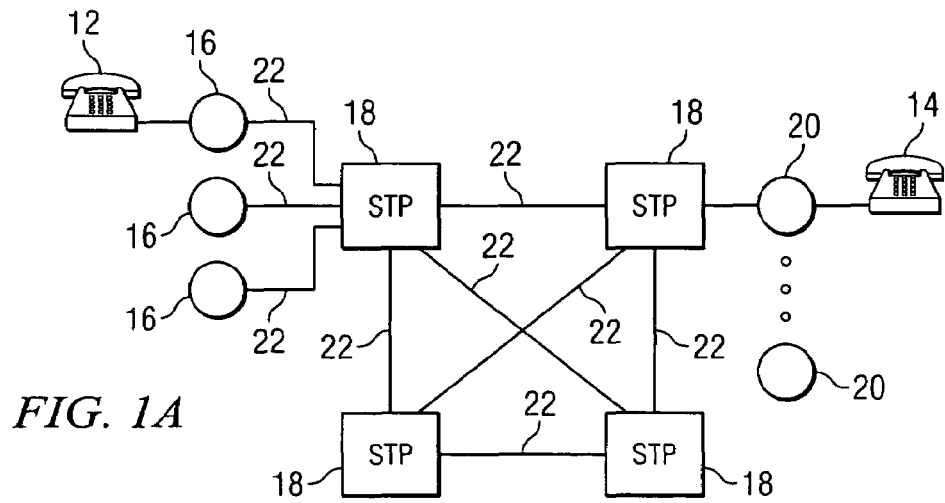
FIG. 1A is a schematic diagram illustrating a communication network that may benefit from the teachings of the invention.

FIG. 1A illustrates a communication system 10 that may benefit from the teachings of the invention. As one example, communication system 10 may provide a communication link between a caller 12 and a recipient of the call 14. Such a call may proceed through one of a plurality of end offices 16, through one or more signaling transfer points 18, and then through another end office 20. End offices 16, signaling transfer points 18, and end offices 20 are connected together by a plurality of SS7 links 22.

Figure 1B:
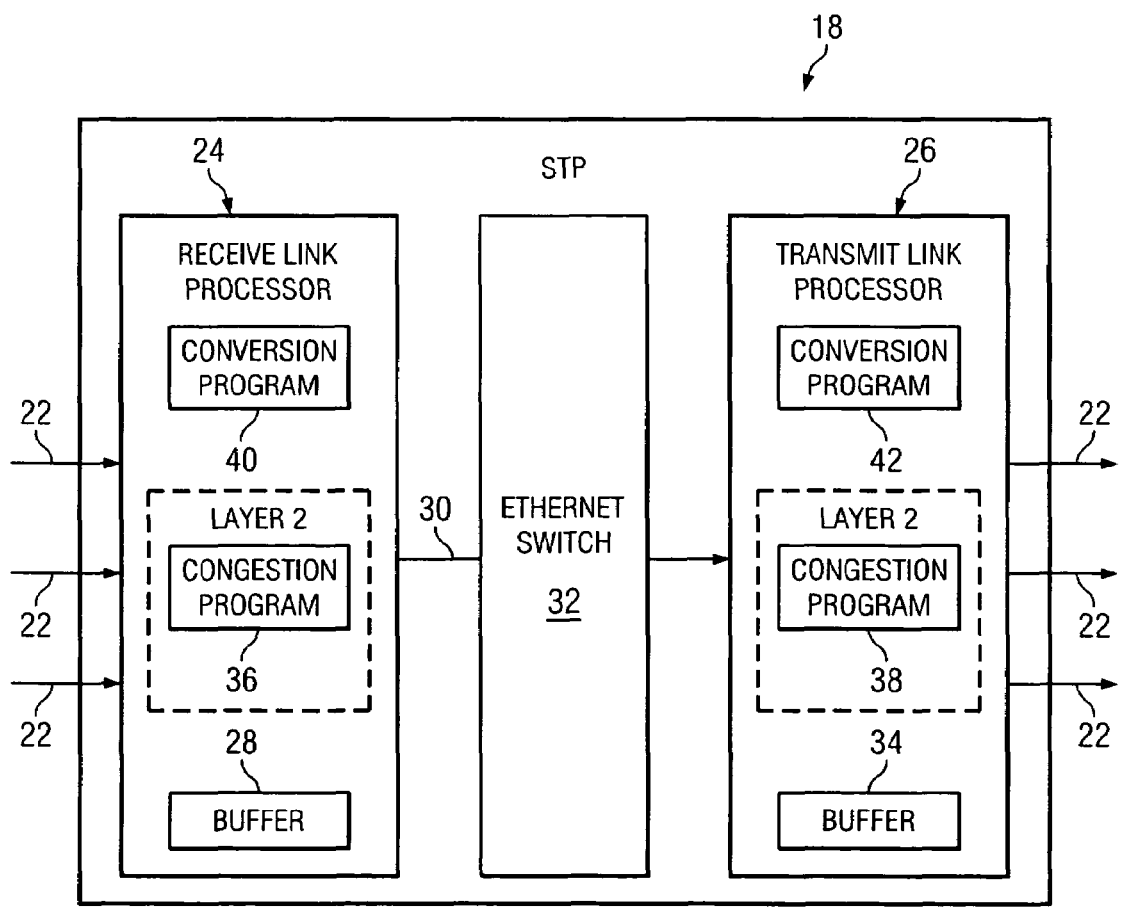
FIG. 1B is a schematic diagram illustrating a signal transfer point of the communication system of FIG. 1A according to the teachings of the invention.

FIG. 1B illustrates additional details of one example of signaling transfer point 18. Signaling transfer point 18 includes a plurality of receive link processors 24 (only one explicitly shown) and a plurality of transmission link processors 26 (only one explicitly shown). Receive link processor 24 receives communications from a plurality of SS7 links and buffers such data communication in a buffer 28. At an appropriate time the communications are transmitted over line 30 to an Ethernet switch 32, in this example. Conversely, transmit link processor 26 uses a buffer 34 for receiving communications from Ethernet switch 32, buffering those communications, and transmitting those communications over a plurality of SS7 links 22 to an end office or an another signaling transfer point.

Included within link processor 24 is a congestion program 36, which is often programmed at Level 2 of the SS7 protocol stack, often using a lower level language, such as assembly language. However, congestion program 36 could be programmed in any suitable language at any suitable layer of the SS7 stack or may include hard-wired programming, such as Application Specific Integrated Circuits. Congestion program 36 classifies a congestion level of buffer 28 according to a specified set of rules. In one example, the set of rules is specified by ITU Q.704, Technique 1. Similarly, transmit link processor 26 includes a congestion classification program 38 as part of its Level 2 programming to classify the congestion level of buffer 34.

According to the teachings of the invention, it is recognized that it would be desirable to provide a link processor capable of classifying the congestion level of associated buffers according to any of the three commonly used techniques, or through other techniques. The teachings of the invention recognize that rewriting the congestion program at Level 2 would be difficult because it is typically written in a lower level language, such as assembly and it might have different implementation e.g., hardware implementation and software implementation on the same system. Thus, according to the teachings of the invention, conversion programs 40 and 42 are provided that convert the congestion level provided by program 36, or program 38, into a congestion level according to the desired set of rules. Additional details are described in greater detail in conjunction with FIGS. 2 through 5.

FIG. 2 is a block diagram illustrating transmit link processor 26, showing additional details of the processor. Receive link processor 24 is substantially similar and is not illustrated separately for brevity of description. As illustrated, transmit link processor 26 includes a conversion program 42 in communication with congestion program 38, which is typically coded at Level 2 of the SS7 protocol stack. Conversion program 42 receives a plurality of threshold levels, indicated by reference numeral 44. Such threshold levels may be provided by a user or determined according to other techniques. In one example, threshold levels 44 are an onset level and an abatement level consistent with the onset level and abatement levels used with Techniques 2 and 3 of ITU Q.704; however, other threshold levels and other numbers of threshold levels may be utilized. In general, in these examples, an abatement threshold refers to the level of buffer usage at which a congestion level is lowered and an onset level refers to the level of buffer usage at which a congestion level is increased. A discard level refers to the level of buffer usage above which a discard level is increased and below which a discard level is lowered.

Based upon the received threshold levels, conversion program 42 generates, in this example, nine threshold levels consistent with ITU Q.704 Technique 1. Although the invention is described in the context of converting Techniques 2 and 3 thresholds into Technique 1 thresholds, other suitable conversions may be made. Congestion program 38 receives the nine converted threshold levels, calculates the congestion level of buffer 34 based upon usage of the buffer and the received threshold levels, and reports a congestion level back to conversion program 42. According to one embodiment, the reporting of the congestion level is in the form of a congestion status cXdY, where X is the congestion level and Y is the discard level. The congestion level refers to the level of congestion and the discard level refers to which discard threshold has been crossed, as is commonly known and specified in ITU Q.704, which is incorporated herein by reference. Other reporting schemes may be utilized, including reporting simply the congestion level rather than the combination of the congestion and discard levels. In response, conversion program 42 receives a report of the amount of congestion in buffer 34 and generates a converted congestion level consistent with the set of rules being applied, for example, Technique 2 or 3. Conversion program 42 then reports the calculated congestion level as would normally be performed at Level 2 of the SS7 protocol stack.

One important aspect of the invention involves the appropriate determination of, in this example, the nine converted threshold levels that are generated by conversion program 42 and provided to congestion program 38 such that the congestion level reported back by congestion program 38 to conversion program 42 results in a converted congestion level that is consistent with the desired congestion level classification technique. Example details associated with converting two threshold levels associated with Technique 2 into the nine threshold levels associated with Technique 1 are described in greater detail below in conjunction with FIG. 4. Example details associated with converting two threshold levels associated with Technique 3 into the nine threshold levels associated with Technique 1 are described in greater detail below in conjunction with FIG. 5.

Thus, according to the teachings of the invention, a conversion program is provided that allows classification of a congestion level of a buffer according to one or more techniques other than the techniques for which a congestion program may already be provided. This approach has the advantage of allowing modification of existing link processors to operate with different congestion classification approaches than they currently operate with. In addition, this approach allows for the manufacture of link processors having the capability of generating a congestion level based on a plurality of different congestion classification approaches.

FIG. 3 is a flowchart illustrating example steps that may be performed by a conversion program according to the teachings of the invention. The method 100 begins at step 102. At step 104 thresholds for the chosen congestion classification technique are received. In one example these thresholds comprise one abatement threshold and one onset threshold; however, other types of thresholds and other numbers of thresholds may be used. At step 106, the received thresholds are converted into a plurality of thresholds that are required for a congestion program. In one example, nine thresholds are required for Technique 1, according to ITU Q.704, and thus nine threshold levels are generated based upon the threshold levels provided at step 104. Example approaches for generating nine threshold levels from provided threshold levels are described in greater detail in conjunction with FIG. 4 for conversion from Technique 2 and in FIG. 5 for conversion from Technique 3. Thus, the threshold levels generated for the congestion program are the levels that would be expected by the congestion program.

At step 108, the generated threshold levels are provided to the congestion program. At step 110, a congestion level is generated by the congestion program for an associated buffer. In one example, in the example which nine threshold levels are used, the congestion level may be reported as congestion status in the form of cXdY, where X represents the congestion level and D represents the discard level; however, other reporting mechanisms may be used. Based upon the congestion level generated at step 110 and reported to the conversion program, the conversion program generates a congestion level based upon the congestion level determined at step 110. Example techniques for generating the converted congestion level based upon the congestion level generated at step 110 are described in greater detail below in conjunction with FIGS. 4 and 5. The method concludes at step 114.

Thus, a method is provided that allows generation of a congestion level according to one set of rules by utilizing a congestion program that generates congestion levels according to a different set of rules. This is performed by providing necessary threshold levels to the congestion program and converting the congestion level determined by the congestion program into a congestion level consistent with the desired congestion classification scheme.

FIG. 4 is a schematic diagram illustrating conversion of two threshold levels according to Technique 2 into nine threshold levels according to Technique 1 and the conversion back to a congestion level according to Technique 2 based upon a calculated congestion level according to Technique 1. In this example, an abatement threshold level 120 has a value of one hundred and an onset threshold level 122 has a value of two hundred. These threshold levels correspond to the threshold levels provided to conversion program at reference numeral 44 (FIG. 2).

As described above, according to one example, these two threshold levels 120, 122 are converted into nine threshold levels consistent with Technique 1. These nine threshold levels are converted according to table 124, in this example. As table 124 illustrates, the first abatement level is set to abatement threshold 120, the first onset level is set to the abatement threshold 120 plus one, and the first discard level is set to the onset threshold 122 minus one. The second abatement level is set to the onset level minus one, the second onset level is set to onset 122, and the second discard level is set to the maximum number of buffers allocated for the link. The second discard level, the third abatement level, the third onset level, and the third discard level are set to the maximum number of buffers, the maximum number of buffers plus one, the maximum number of buffers plus two, and the maximum number of buffers plus three, respectively. The key conversions in this table 124 are the setting of first abatement level to abatement level 120 and the setting of the second onset level 200 to onset level 122. The other generated threshold levels 126 could take other arbitrary values as long as they fall within the general sequence shown in Table 124. Six of the nine thresholds are shown collectively at 128 in conjunction with assigned values in this example.

The generated congestion status is illustrated collectively at 130 based upon sample usages of the associated buffer. Shown are five congestion statuses. As illustrated, all congestion statuses corresponding to buffer levels between one hundred and two hundred generate a congestion one level, with various discard levels. Congestion levels resulting from buffer usages in excess of two hundred generate a congestion level two, and congestion levels based upon the usages less than one hundred can generate a congestion level zero. Thus, by setting the first abatement level equal to abatement 120 and the second onset level equal to onset 122, the reported congestion levels of 0, 1, and 2 may be utilized by Technique 2 to generate the congestion level specified by the Technique 2 rules. In particular, in this example, if a congestion level of zero is reported, the congestion level generated by the conversion program is decremented. If a congestion level of one is reported, the congestion level generated by conversion program remains the same. If the congestion level is reported as two, the congestion level generated by congestion conversion two is incremented.

Thus, by appropriate selection of the first abatement and the second onset level as corresponding to abatement 120 and onset 122, a converted congestion level according to Technique 2 may be generated based upon calculations performed according to Technique 1.

FIG. 5 is a diagram illustrating a conversion of threshold levels according to Technique 3 to threshold levels according to Technique 1 and the subsequent conversion of congestion levels generated according to Technique 1 to those desired according to Technique 3. According to Technique 3 an abatement level and an onset level are provided in a similar fashion to that described above in conjunction with FIG. 4. Thus, in this example, an abatement level of one hundred and an onset level of two hundred is provided. In this example, the nine threshold levels expected for Technique 1 are generated in a similar fashion to that described above in conjunction with FIG. 4. However, in this example, the first abatement level is set to one hundred and the first onset level is set to two hundred, with all other thresholds set to maximum number of buffers (or more). The first abatement level 150 and the first onset level 152 are illustrated as corresponding to abatement level 120 and onset level 122, respectively. The remaining thresholds are not illustrated. Reported congestion levels have possible values of zero, corresponding to levels below first abatement level 150, and one, corresponding to usage in excess of 152. This reporting of congestion level would be converted by the conversion program into either a congested or uncongested state, resulting in congestion levels expected by Technique 3. According to one example, this is performed by mapping congestion level one to congested and mapping congestion level zero to uncongested. Thus, according to the teachings of the invention by appropriate conversion of an abatement level and an onset level to the appropriate nine threshold levels for Technique 1, a congestion level may be calculated according to Technique 3 based upon the level generated according to Technique 1.

Although the present invention and its advantages have been described in detail, it should be understood that various changes, substitutions, and alterations can be made therein without departing from the spirit and scope of the invention as defined by the appended claims.

What is claimed is:

1. A congestion method for determining a congestion level for a buffer associated with an SS7 link according to congestion status rules other than the National Technique with multiple congestion levels and multiple congestion priorities as defined in ITU Q. 704 comprising:

receiving, at a first computer program in a link processor, an abatement level and an onset level for the buffer;

generating by the first computer program, based on the received abatement level and the received onset level, nine threshold levels for use by a second computer program to determine a congestion level for the buffer, the nine threshold levels including:

first, second, and third onset thresholds, wherein the third onset threshold is greater than the second onset threshold and the second onset threshold is greater than the first onset threshold;

first, second, and third abatement thresholds, wherein the third abatement threshold is greater than the second abatement threshold and the second abatement threshold is greater than the first abatement threshold;

first, second, and third discard thresholds, wherein the third discard threshold is greater than the second discard threshold and the second discard threshold is greater than the first discard threshold;
providing the nine threshold levels to the second computer program;
generating, by the second computer program, a congestion level for the buffer based on the nine threshold levels and usage of the buffer according to congestion status rules specified by National Technique with multiple congestion levels and multiple congestion priorities and providing the generated congestion level to the first computer program; and
converting, by the first computer program, the generated congestion level into a converted congestion level, the converted congestion level being the congestion level arising from usage of the buffer, the received abatement level, and the received onset level that is specified by a set of rules selected from the group consisting of the National Technique with multiple congestion levels without congestion priority, as defined by ITU Q. 704 and the International Technique, as defined by ITU Q. 704.

2. A computerized method for determining a congestion level for a buffer associated with an SS7 link according to a first set of congestion rules comprising:
receiving an abatement level and onset level for the buffer;
generating, based on the received abatement level and the received onset level, more than two threshold levels for use by a congestion program, the congestion program operable to generate a congestion level for the buffer according to a second set of rules different from the first set of rules;
providing the generated threshold levels to the congestion program;
receiving from the congestion program a congestion level for the butter based on the generated threshold levels, a usage of the buffer, and the second set of rules; and
converting the received congestion level into a converted congestion level.

3. The method of claim 2, wherein the converted congestion level is the congestion that would result from the first set of rules based on the abatement level, the onset level, and usage of the buffer.

4. The method of claim 2, wherein generating more than two threshold levels comprises generating first, second, and third abatement levels, first, second, and third onset levels, and first, second, and third discard levels.

5. The method of claim 2, wherein converting the received congestion level for the buffer comprises:
decrementing a previous converted congestion level if the received congestion level is a first value;
maintaining the previous converted congestion level if the received congestion level is a second value; and
incrementing the previous converted congestion level if the received congestion level is a third value.

6. The method of claim 2, wherein the first set of rules comprises the National Technique with multiple congestion levels without congestion priority, as defined by ITU Q. 704.

7. The method of claim 2, wherein the first set of rules comprises the International Technique, as defined by ITU Q. 704.

8. The method of claim 2, wherein the second set of rules comprises the National Technique with multiple congestion levels and multiple congestion priorities as defined in ITU Q. 704.

9. The method at claim 4, wherein:
the first, second, and third abatement levels are defined as A1, A2, and A3, respectively;
the first, second, and third onset levels are defined as O1, O2, and O3, respectively;
the first, second, and third discard levels are defined as D1, D2, and D3, respectively;
wherein A1<O1<D1 and D1≦O2 and O1<A2 and A2<O2<D2 and D2≦O3 and O2<A3 and A3<O3<D3.

10. The method of claim 4, wherein:
the first, second, and third abatement levels are defined as A1, A2, and A3, respectively;
the first, second, and third onset levels are defined as O1, O2, and O3, respectively;
the first, second, and third discard levels are defined as D1, D2, and D3, respectively;
wherein A1<O1<D1 and D1≦O2 and O1<A2 and A2<O2<D2 and D2≦O3 and O2<A3 and A3<O3<D3.

11. A link processor comprising:
a buffer;
a congestion program operable to determine a congestion level for the buffer based upon a plurality of provided thresholds and usage of the buffer;
a conversion program operable to generate a converted congestion level for the buffer based on the congestion level determined by the congestion program, the conversion program further operable to:
receive an abatement level and an onset level with buffer;
generate, based on the received abatement level and received onset level, a plurality of threshold levels for use by the congestion program and provide the plurality of threshold levels to the congestion program;
receive a congestion level for the buffer determined by the congestion program based upon the plurality of provided threshold levels and usage of the buffer; and
convert the received congestion level into a converted congestion level.

12. The link processor of claim 11, wherein the plurality of threshold levels comprises first, second, and third abatement levels, first, second, and third onset levels, and first, second, and third discard levels.

13. The link processor of claim 11, wherein the congestion program is operable to produce nine congestion levels according to the National Technique with multiple congestion levels and multiple congestion priorities as defined in ITU Q. 704.

14. The link processor of claim 11, wherein the conversion program is operable to convert the received congestion level into a converted congestion level by:
decrementing a previous converted congestion level if the congestion level is a first value;
maintain the previous converted congestion level if the congestion level is a second value; and
increment the previous converted congestion level if the congestion level is a third value.

15. The link processor of claim 11, wherein the conversion program is operable to convert the received congestion level into a converted congestion level by setting the converted congestion level to a first level if the received congestion level is a particular level in setting the converted congestion level to a second level if the received congestion level is a level different from the particular level.

16. The link processor of claim 11, wherein the received congestion level is a congestion level that is specified by the buffer usage, the received abatement level, and the onset level according to the National Technique with multiple congestion levels without congestion priority, as defined by ITU Q. 704.

17. The link processor of claim 11, wherein the received congestion level is a congestion level that is specified by the buffer usage, the received abatement level, and the onset level according to the International Technique, as defined by ITU Q. 704.

18. The link processor of claim 11, wherein the congestion program is operable to determine a congestion level for the buffer based on the plurality of provided thresholds and usage of the buffer according to the National Technique with multiple congestion levels and multiple congestion priorities as defined in ITU Q. 704.

19. The link processor of claim 12, wherein:

the first, second, and third abatement levels are defined as $A1$, $A2$, and $A3$, respectively;

the first, second, and third onset levels are defined as $O1$, $O2$, and $O3$, respectively;

the first, second, and third discard levels are defined as $D1$, $D2$, and $D3$, respectively;

wherein $A1<O1<D1$ and $D1 \leqq O2$ and $O1<A2$ and $A2<O2<D2$ and $D2 \leqq O3$ and $O2<A3$ and $A3<O3<D3$.

20. The link processor of claim 12, wherein:

the first, second, and third abatement levels are defined as $A1$, $A2$, and $A3$ respectively;

the first, second, and third onset levels are defined as $O1$, $O2$, and $O3$, respectively;

the first, second, and third discard levels are defined as $D1$, $D2$, and $D3$, respectively;

wherein $A1<O1<D1$ and $D1 \leqq O2$ and $O1<A2$ and $A2<O2<D2$ and $D2 \leqq O3$ and $O2<A3$ and. $A3<O3<D3$.

* * * * *